UNITED STATES PATENT OFFICE 2,477,262

PROCESS FOR UTILIZING THE DUST FROM CEMENT KILNS

Heinrich Wilhelm Mooser, Maastricht, Netherlands, assignor to N. V. Eerste Nederlandsche Cement Industrie, Maastricht, Netherlands No Drawing. Application August 11, 1939, Serial No. 289,627. In Germany August 16, 1938

Section 3, Public Law 690, August 8, 1946
Patent expires August 16, 1958

8 Claims. (Cl. 106—100)

The waste gases of cement kilns convey a varying quantity of dust towards the chimney. This dust consists of raw material, the loss of which increases the price of the cement.

The amount of dust varies according to the raw material employed and also depends on the load on the kiln. In fact, the amount normally increases with an increased production load.

Numerous means are known for recovering this dust. On the other hand, there is no possibility, with these means of making an effective use of the materials obtained. Formerly, one had to be content with separating the finest particles in order to sell these as fertilisers, for which they are suitable, on account of their more or less high potassium and calcium content. They are also employed as fillers for asphalt roads and the like.

It has also been proposed to add the dust to the raw materials which are fed to the kiln. In this way, however, the alkali content is increased, whereby the resulting clinker provides a cement which, when stored in sacks, has the great disadvantage of forming lumps.

The object of the invention is to enable the dust to be utilised in such a way that it may be converted into cement of good quality.

In carrying out the invention, the dust is recovered and the particles which have a too high alkali content are removed according to a known process. To the remaining, that is the greater part of the dust, corrective additions are made, if necessary, in order to obtain the best possible material for providing a good cement. This mixture is introduced direct into the combustion zone or into the flame of the cement kiln, and, in this way, the dust is formed into clinker whilst the greatest part of the alkalis contained therein are volatilised and pass out with the combustion gases. The alkali content of the clinker is, in this way, reduced to a percentage compatible with a good quality cement.

The process according to the invention is applicable both to kilns employing the wet process and to kilns employing the dry process.

The mixture of the dust and the corrective material must necessarily be dry both for the direct introduction into the combustion zone and into the flame. In order, however, to prevent the very fine particles of dust being carried off by the combustion gases, they may be, according to the invention, formed into lumps or grains by known means, for example, by the addition of bitumen or other binding medium.

The dust may, according to the invention, be treated in the same way for the dry and for the wet process.

The introduction direct into the combustion zone or into the flame is effected by means of a special conduit, which itself ends in the former, or through the pipe for injecting the fresh air and the fuel, for example, coal dust.

In the latter case, that is to say, with an intimate mixture of the dust with the fuel, the former is brought more easily to the temperature necessary for the volatilisation of the alkalis.

For the correct employment of the process according to the invention, it is desirable that the method of obtaining the dust permits sorting of the same according to the degrees of fineness. The finest particles of dust are also the most rich in alkalis and, therefore, are the least valuable for reemployment. In certain cases, particularly if the efficiency of the dust-removing device amounts to more than 90%, it is advantageous and even necessary, to exclude from the process the finest particles, which are too rich in alkalis, for example, those which contain more than 4% alkalis. These may, moreover, be advantageously employed as fertilisers on account of their high alkali content.

In plants employing several cement kilns, the whole of the dust recovered from the waste gases of the several kilns may be introduced directly into the combustion zone of one kiln specially used for this purpose. The said dust may, if desired, be formed first into lumps, and it may also be accurately mixed before it is formed into lumps, and is then introduced into the combustion zone. In this case, it is possible to utilise dust containing more than 4% alkalis, but care must be taken to avoid condensation of the alkalis contained in the combustion gases of the special kiln.

Obviously, the invention is not limited to the above stated forms of application, but includes the other forms as set out in the following claims.

I claim:

1. A process for utilising the dust recovered from the waste gases of cement kilns, characterised in that the dust is introduced directly into the flame of a cement kiln and is there formed into clinker, whilst the alkalis contained in the dust, which impair the good quality of the cement, are, by means of the very high temperature, for the most part volatilised and are carried along by the combustion gases.

2. A process for utilising the dust of cement kilns consisting in recovering the dust from the waste gases, sorting same according to degrees of fineness, separating the finest part of the dust which is also the richest in alkali, and introducing the remainder directly into the flame of a cement kiln and forming it there into clinker whilst allowing the alkalis contained in the dust which impair the good quality of the cement, to be for the most part volatilised by the very high temperature and to be carried along by the combustion gases.

3. A process for utilising the dust of cement kilns consisting in first recovering the dust from the waste gases, then adding to the separated dust corrective additions necessary for obtaining a good cement under the conditions occurring in the kiln, introducing the dust with the additions directly into the flame of a cement kiln and forming it there into clinker, whilst allowing the alkalis contained in the dust which impair the good quality of the cement to be for the most part volatilised by the very high temperature and to be carried along by the combustion gases.

4. A process for utilising the dust of cement kilns, consisting in separating the dust from the waste gases, sorting the recovered dust according to degrees of fineness and separating out the finest part of the dust which is also the richest in alkalis, adding to the remainder of the dust corrective additions necessary for obtaining a good cement under the conditions occurring in the kiln, and introducing the dust together with the additions directly into the flame of a cement kiln where it is formed into clinker whilst the alkalis contained in the dust which impair the good quality of the cement are, for the most part, volatilised by the high temperature and are carried along by the combustion gases.

5. A process for utilising the dust of cement kilns consisting in separating the dust from the waste gases, forming it into lumps or particles by known means, for example, by the addition of bitumen or other binding medium and introducing the re-formed dust directly into the flame of a cement kiln, where it is formed into clinker whilst the alkalis contained in the dust which impair the good quality of the cement are, by means of the very high temperature, for the most volatilised and are carried along by the combustion gases.

6. A process for utilising the dust of cement kilns consisting in first separating the dust from the waste gases and then introducing the dust directly into the flame of the kilns by means of a special conduit terminating therein, forming said dust into clinker whilst allowing the alkalis contained in the dust, which impair the good quality of the cement, to be for the most part volatilised by the very high temperature in the combustion zone, and are carried along by the combustion gases.

7. A process for utilising the dust of cement kilns consisting in separating the dust from the waste gases and introducing the separated dust through the known fuel injection pipe of the kiln into the flame of the kiln, to be formed there into clinker whilst the alkalis contained in the dust, which impair the good quality of the cement, are, by means of the very high temperature, for the most volatilised and are carried along by the combustion gases.

8. In a process according to claim 1, the step consisting in first sorting the dust, during recovery, according to degrees of fineness, separating the finest dust which is richest in alkalis and introducing the remainder into the flame.

HEINRICH WILHELM MOOSER.

REFERENCES CITED

The following references are of record in the file of this patent:

UNITED STATES PATENTS

| Number | Name | Date |
| --- | --- | --- |
| 1,132,527 | Schneider | Mar. 16, 1915 |
| 1,688,882 | Schmidt | Oct. 23, 1928 |
| 1,916,716 | Dahl et al. | July 4, 1933 |
| 1,955,121 | Folke et al. | Apr. 17, 1934 |
| 2,006,386 | Durbin et al. | July 2, 1935 |

FOREIGN PATENTS

| Number | Country | Date |
| --- | --- | --- |
| 12,353 | Great Britain | 1906 |
| 272,174 | Germany | 1914 |
| 637,914 | Germany | 1936 |